United States Patent [19]

Schaefer

[11] 4,436,327
[45] Mar. 13, 1984

[54] CLAMP JOINT FOR PIPES

[76] Inventor: Rudolf Schaefer, Brauerstrasse 35, D-4100 Duisburg 1, Fed. Rep. of Germany

[21] Appl. No.: 294,562

[22] Filed: Aug. 20, 1981

[30] Foreign Application Priority Data

Aug. 20, 1980 [DE] Fed. Rep. of Germany ....... 3031314

[51] Int. Cl.$^3$ ...................... F16L 23/00; F16L 19/00; F16L 25/00
[52] U.S. Cl. .................................. 285/364; 285/406; 285/358; 285/331
[58] Field of Search ............... 285/364, 406, 420, 358, 285/178, 363, 331

[56] References Cited

U.S. PATENT DOCUMENTS 1,178,714 4/1916 Griffin ........................... 285/363 X
3,737,180 6/1973 Hayes, Jr. et al. ............. 285/178 X Primary Examiner—Richard J. Scanlan, Jr.
Attorney, Agent, or Firm—Spencer & Frank

[57] ABSTRACT

Clamp joint for axially clamping together the end faces of two coaxial cylindrical members having identical diameters, the clamp joint including at least one first projection secured to one member near the end face thereof and at least one second projection secured to the other member near the end face thereof, each projection projecting substantially radially outwardly from its associated member, and lying in a plane parallel to the common longitudinal axis of the members, a connecting part articulated to the first projection, extending axially from the first member to the region of the second projection and lying in a plane parallel to the common longitudinal axis of the members, the second projection and the connecting part being provided with bores whose axes are transverse to the common longitudinal axis of the members and located to be aligned with one another when the other end faces of the members are in proximity to one another, and a bolt arranged to be inserted into the bores in the direction of their axes and being provided with a laterally projecting eccentric portion extending along a region of its length to engage one of the bores. One bore has a diameter which corresponds to the diameter of the bolt and the lateral extent of the eccentric portion and the other bore has a diameter which is smaller than that of the one bore and which corresponds to the diameter of the bolt outside of the region of its eccentric portion.

9 Claims, 6 Drawing Figures

CLAMP JOINT FOR PIPES

The invention relates to a clamp joint for the end-face attachment of pipes to each other.

In order to join pipes to each other at the end faces, it is known either to weld them together or else to provide the pipes with flanges which are screwed together. These customary types of attachment are complicated and require skilled labour. The joints are inelastic and immobile, so that it is scarcely possible to absorb either movements or expansions. Furthermore, to release these joints involves a high labour outlay.

It is the aim of the invention to produce a releasable joint which is easy to manipulate for pipes.

This aim is achieved according to the invention in that there is attached to or shaped on the pipe end or cover externally at least one projection, to which there is articulated a connecting part, which is attachable to a corresponding projection of the adjacent pipe or cover by a bolt (eccentric bolt), which can be plugged through a bore of the connecting part and a bore of the projection of the adjacent pipe or cover, and that to vary the position of the connecting part with reference to the projection of the adjacent pipe or cover, the bolt exhibits an eccentric region which comes into abutment with one of the bore walls during a rotation of the bolt about its longitudinal axis.

A joint of such simplicity is cheap and easy to manipulate, because it requires no welding or screwing and can be operated by laymen. The joint is releasable and can be used repeatedly, whilst high leak-tightness and reliability is constantly achieved. The connecting parts allow adequate mobility, so that temperature fluctuations, pressure variations and earth movements can be absorbed axially, radially and also pivotally about the joint position. The joint exerts a centering effect upon the pipes to each other and allows a variation of the clamping force by rotary adjustment of the bolts. By different bolts with different sized eccentrics, and also by a subsequent machining of the eccentrics, it is possible to achieve selectively great differences in the clamping forces.

The bolt can be produced particularly simply if the eccentric region of the bolt is formed by a projection or cam. It is preferably proposed that the bores in the projections exhibit the same diameter.

A particularly simple embodiment is created in that the bores in the projections exhibit a greater diameter than the bore in the connecting part accmmodating the bolt, and that the eccentric region of the bolt is enclosed in a bore in a projection. For this purpose it is also proposed that the projections are formed by flat material, particularly freely protruding straps. The projections may also protrude radially.

Particularly high forces can be generated if the bolt can be plugged through two projections arranged mutually parallel. In this case the connecting part may be enclosed between the projections. It is further proposed that the connecting part is a flat part which preferably lies axially parallel to the pipes.

A particularly great clamping movement of the pipes to each other is obtained in that the articulation point of the connecting part is also formed by a bolt (hinge bolt). In this case this second bolt may also exhibit an eccentric region, particularly a projection or cam. It is preferably proposed that the bores of the projections and of the connecting part extend mutually parallel.

Reliable transmission of forces is achieved in that the diameter of the bore(s) in the connecting part accommodating the bolt is equal to or slightly greater than the diameter of the bolt. Also for this purpose, the diameter of the bores in the projections may be equal to or slightly greater than the diameter of the bolt including its eccentric part.

An exertion of clamping force upon two juxtaposed projections of a pipe by the bolt is achieved in that the bolt exhibits two eccentrics at an axial interval on the same side. In this case the connecting part may exhibit a recess in the bore wall for plugging through the second eccentric.

The bolt may be manipulated without tools if the bolt exhibits a handle at one end.

Securing of the bolt in the plugged-in and rotated position is achieved in that at least one bolt exhibits at the end to be plugged into the bores a stop (projection, cam) projecting radially beyond the bore diameter, which is introducible through concentric longitudinal grooves arranged in the bore walls and abut the lower edge of the bore after the bolt is rotated. In this case a locking spring, by which the stop can be fixed in the clamping position of the bolt, may be attached to the edge of the bore.

A clamping force axial or concentric to the longitudinal axes of the pipes is achieved in that the bores and bolts are arranged tangentially to, or parallel to a tangent to, the pipe. Excessive movement of the pipe in the plugging-in direction is prevented in that a protruding rim or collar is provided on the top end of the bolt.

Two exemplary embodiments of the invention are illustrated in the drawings and described more fully below. In the drawings.

Figure 1:
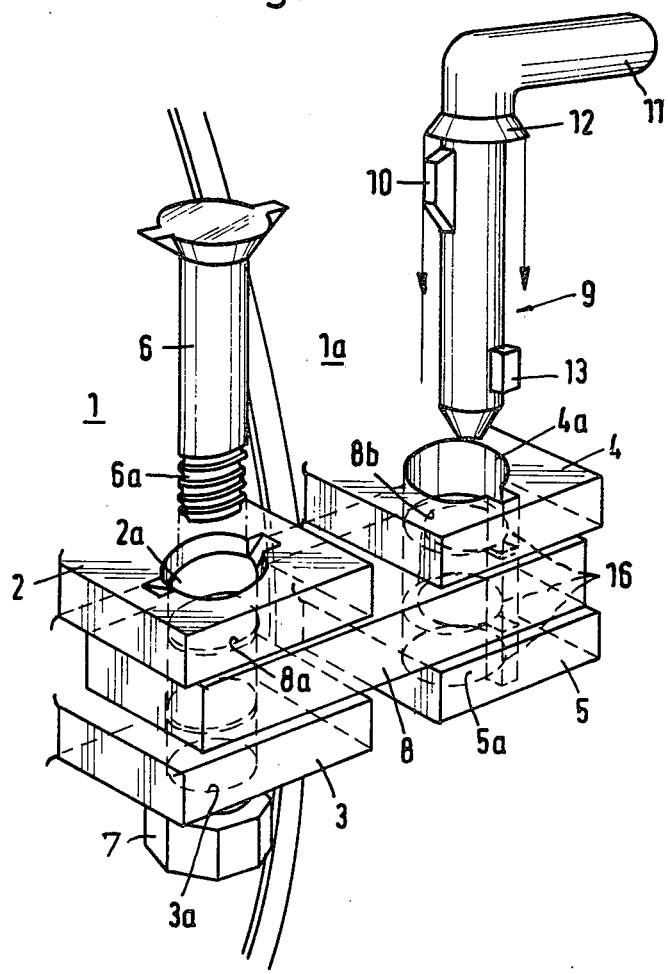
FIG. 1 shows a perspective view of a first exemplary embodiment.
Figure 2:
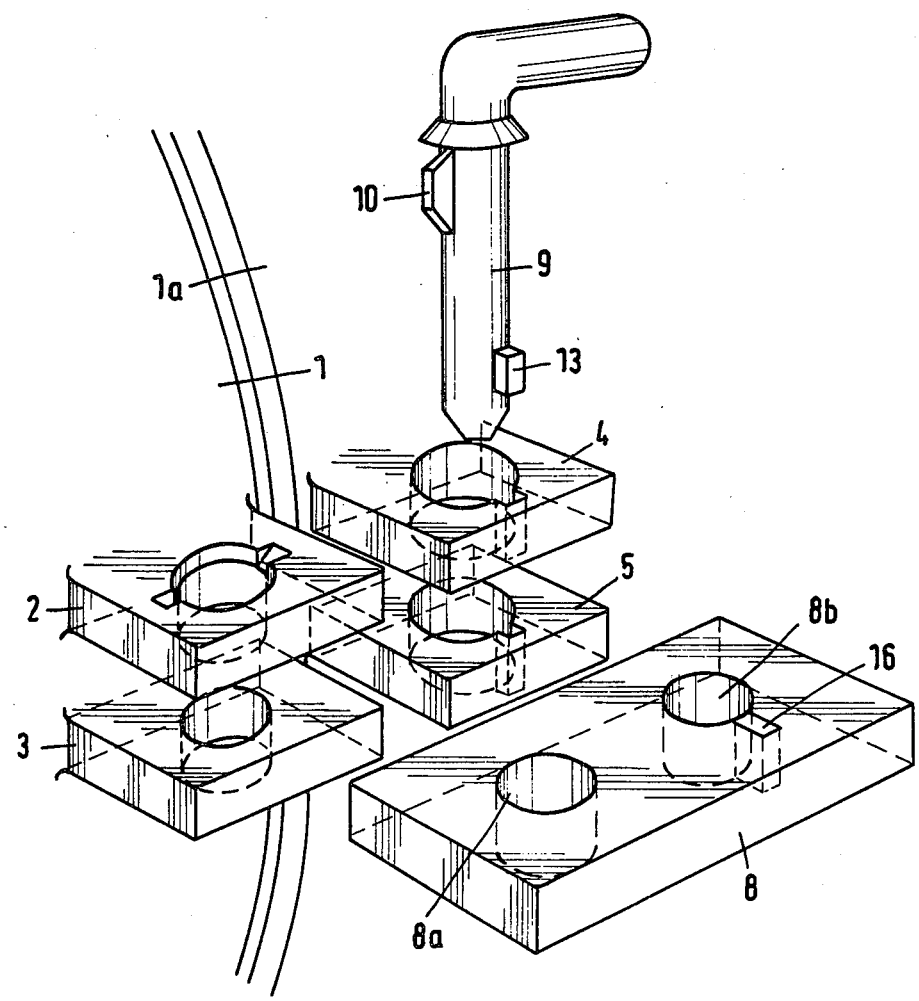
FIG. 2 shows a view corresponding to FIG. 1 with the connecting part withdrawn.

In the exemplary embodiment according to FIGS. 1 and 2, there is welded to or shaped on by a narrow side to the external wall of a first pipe 1, in its end region, a square flat part 2 protruding approximately radially, which exhibits centrally and tangentially, or parallel to the tangent to the pipe, a bore 2a. At an interval from and parallel to the flat part 2, and in alignment with its external sides, there is welded to or shaped on the pipe wall a second flat part 3, the interval being a little greater than the thickness of the flat parts. In the same way, on the second pipe 1a applied by its end face, flat parts 4 and 5 of equal dimensions are welded or shaped mutually parallel and in alignment by their flat sides with the flat parts 2 and 3. The flat part 3 exhibits a central bore 3a aligned with the bore 2a, and the flat parts 4 and 5 exhibit mutually aligned central bores 4a and 5a.

A hinge bolt 6 or equal diameter is enclosed in the bores 2a and 3a, being sunk with its head in the flat part 2, and its end protruding downwards out of the flat part 3 carrying a screwthread 6a on which a nut 7 is screwed. A connecting part 8 consisting of a flat iron, the thickness of which corresponds approximately to that of the flat parts, is enclosed between the flat parts 2 to 5 approximately parallel to them. The connecting part 8 has a bore 8a aligned with the bores 2a and 3a, through which the connecting part 8 is mounted rotatably on the hinge bolt 6.

The connecting part 8 has on the side opposite the bore 8a a second bore 8b which is arranged in the region of the bores 4a, 5a, located parallel to the latter and exhibits a smaller diameter than the latter. A cylindrical eccentric bolt 9, the diameter of which is a little smaller than that of the second bore 8b, is enclosed in the bores 4a, 5a and 8b. The eccentric bolt 9 exhibits as eccentric a projecting nose 10, which during a rotation of the bolt 9 rubs along the wall of the bore 4a and thereby modifies the position of the connecting part 8 with reference to the flat parts 4 and 5. Since the connecting part 8 is articulated to the flat parts 2 and 3, any rotation of the eccentric bolt 9 about its longitudinal axis leads to a variation in the interval of the flat parts 2 and 3 with reference to the flat parts 4 and 5, and hence to a variation of the interval of the end faces of the pipes 1 and 1a.

The eccentric bolt 9 may also exhibit a nose or a differently shaped eccentric in the region of the bore 5a in order to involve the bore 5a also in the generation of clamping forces. In this case the bore 8b of the connecting part 8 must carry in its wall a longitudinal slit with the dimensions of the eccentric in order to permit the eccentric bolt to be plugged through the bore 8b.

The eccentric bolt 9 has an angled part as handle 11 at its top end, and between the handle 11 and the nose 10 a collar 12 which comes into abutment with the top side of the flat iron piece 4 in order to achieve accurate positioning and maintenance of the axial position of the eccentric bolt. The eccentric bolt 9 exhibits, at its end opposite the handle 11, on the part protruding out of the bore 5a, a projecting cam 13 which protrudes as a spring beyond the edge of the bore 5a and thus prevents the eccentric bolt 9 from being pulled out unless the latter is in a position in which the cam 13 coincides with concentric grooves in walls of the bores 4a, 8b and 5a.

Figure 4:
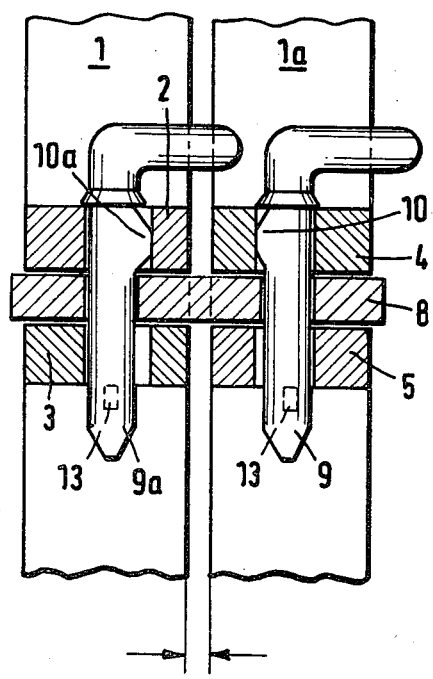
FIG. 4 shows a section corresponding to FIG. 3 in the clamped state.
Figure 3:
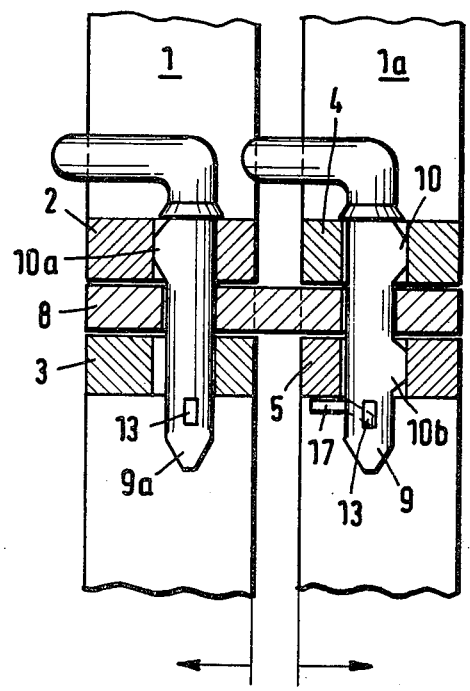
FIG. 3 shows a section made parallel to the pipe axes through the joint in the state before clamping with two eccentric bolts.

The exemplary embodiment shown in FIGS. 3 and 4 differs from that in FIGS. 1 and 2 only in that, instead of the hinge bolt 6, an eccentric bolt 9a is inserted into the flat iron pieces 2 and 3 and the connecting part 8. For this purpose the bore 8a of the connecting part 8 must be constructed of equal size to the bore 8b. By the second eccentric bolt 9a it is possible to double the movement stroke by which the two pipes can be clamped. Bolt 9a is provided, like bolt 9, with an eccentric in the form of a projecting nose 10a and a cam 13.

In further accordance with the invention, bolt 9 can be provided with a second eccentric in the form of a projecting nose 10b at an axial interval form, and on the same side of bolt 9 as, projecting nose 10. This permits bolt 9 to exert a clamping force upon both projections, or flat parts, 4 and 5. This modification is shown in FIG. 3. In this case, the bore 8b in connecting part 8 is provided with a recess for passage of eccentric 10b.

According to another feature of the invention, flat part 5 is provided, as shown in FIG. 3, with a locking spring 17 for fixing cam 13 in the clamping position of bolt 9.

FIG. 4 shows the bolts 9 and 9a in their clamping positions, in which the end faces of pipes 1 and 1a have been moved closer together.

Figure 5:
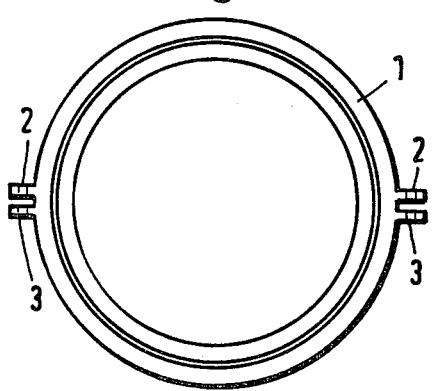
FIG. 5 shows an end plan of a pipe with projections or straps on diametrically opposite sides.

As shown in FIG. 5, each pipe, in this case pipe 1, can be provided with two projections, or flat plates, 2 and 3 at each of two diametrically opposed regions so that the pipe ends are clamped together by two clamp joints.

FIGS. 2 and 3 illustrate the recess which is provided in bore 8b in connecting part 8 for passage of the eccentric 10b shown in FIG. 3.

Figure 6:
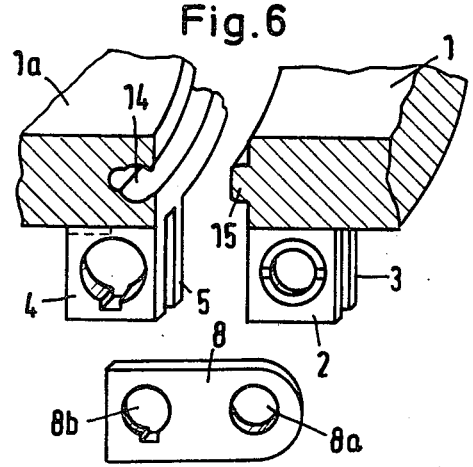
FIG. 6 shows a perspective view of two sectioned pipes with projections for a clamp joint.

As shown in FIG. 6, the two end faces of the pipes may interlace, one end face carrying an annular groove 14, and the end face of the pipe to be attached to it an annular tongue 15, the width of which is slightly smaller than the width of the groove. The groove 14 in this exemplary embodiment is deeper than the height of the tongue 15, so that a soft rubber gasket can be placed in the groove and pressed by the tongue 15.

In the exemplary embodiment according to FIG. 6 the connecting part 8 is rounded on the outside at one end, so that a greater possibility of mutual movement of the pipes exists. This greater possibility of movement is also advantageous if, instead of one of the two pipes, a cover or an end wall is arranged in order to close a pipe. This wall may thus close a tank wagon at its end face.

I claim:

1. Clamp joint for axially clamping together the end faces of first and second coaxial cylindrical members having identical diameters, said clamp joint comprising: at least one first projection secured to the first member near the end face thereof and at least one second projection secured to the second member near the end face thereof, each projection projecting substantially radially outwardly from its associated member, and lying in a plane parallel to the common longitudinal axis of the members, said second projection being provided with a bore whose axis is transverse to the common longitudinal axis of the members; a connecting part articulated to said first projection, extending axially from the first member to the region of said second projection and lying in a plane parallel to the common longitudinal axis of the members, said connecting part being provided with a first bore whose axis is transverse to the common longitudinal axis of the members and located to be aligned with said bore in said second projection when the end faces of the members are in proximity to one another; and a first bolt arranged to be inserted into said first bore in said connecting part and said bore in said second projection in the direction of the axes of said bores, said first bolt being provided with a laterally projecting eccentric portion extending along a selected region of its length to engage one of said bores when said first bolt is inserted therein; with said one of said bores having a diameter which corresponds to the diameter of said first bolt and the lateral extent of said projecting eccentric portion and the other of said bores having a diameter which is smaller than that of said one of said bores and which corresponds to the diameter of said first bolt outside of said selected region of its length, and wherein said first projection is provided with a bore whose axis is transverse to the common longitudinal axis of the members, and said connecting part is provided with a second bore whose axis is transverse to the common longitudinal axis of the members and which is aligned with said bore in said first projection, and further comprising means articulating said connecting part to said first projection, said means being composed of a second bolt arranged to be inserted into said second bore in said connecting part and said bore in said first projection in the direction of the axes of those bores, said second bolt being provided with a laterally projecting eccentric portion extending along a selected region of its length at a location such that when said second bolt is inserted into said bore in said first projection and said second bore in said connecting part, said projecting eccentric portion of said second bolt engages one of said bores into which said second bolt is inserted, with said bore which is engaged by said projecting eccentric portion of said second bolt having a diameter which corresponds to the diameter of said second bolt and the lateral extent of said projecting eccentric portion of said second bolt, and the other of said bores into which said second bolt is inserted having a diameter which is smaller than that of said bore which is engaged by said projecting eccentric portion of said second bolt and which corresponds to the diameter of said second bolt outside of said selected region of its length.

2. Clamp joint as defined in claim 1 wherein one of the members is a pipe and the other of the members is a cover or a pipe.

3. Clamp joint according to claim 1, wherein said projecting eccentric portion of each said bolt is formed by a cam.

4. Clamp joint according to claim 1, wherein said projections have the form of flat pieces.

5. Clamp joint according to claim 1 wherein said one of said bores associated with said first bolt is provided in said second projection, and the other of said bores associated with said first bolt is provided in said connecting part.

6. Clamp joint according to claim 1 wherein there are two said first projections between which one region of said connecting part is enclosed, and two said second projections between which the region of said connecting part in which said bore is provided is enclosed with said bore in said connecting part being aligned with said bores in said second projections.

7. Clamp joint according to claim 6 wherein said first bolt has a free end and a projecting part in the vicinity of said free end, and said first bore in said connecting part and said bore in each said second projection each have a groove for permitting passage of said projecting part.

8. Clamp joint according to claim 7 further comprising a locking spring secured to that one of said second projections which is adjacent said free end of said first bolt when said first bolt is inserted into said first bore in said connecting part and said bore in each said second projection for forming a locking connection with said projecting part of said first bolt.

9. Clamp joint according to claim 6 wherein said first bolt is provided with two laterally projecting eccentric portions each extending along a respective selected region of its length at a location to engage said bore in a respective one of said second projections.

* * * * *